US012511462B1

(12) United States Patent
Foutz et al.

(10) Patent No.: US 12,511,462 B1
(45) Date of Patent: Dec. 30, 2025

(54) PHYSICAL AWARENESS OF TEST-POINT SHARING IN A CIRCUIT DESIGN

(71) Applicant: Cadence Design Systems, Inc., San Jose, CA (US)

(72) Inventors: Brian Foutz, Charlottesville, VA (US); Krishna Chakravadhanula, Vestal, NY (US); Prateek Kumar Rai, Uttar Pradesh (IN); Sarthak Singhal, Noida—UttarPradesh (IN); Vivek Chickermane, Slaterville Springs, NY (US); Huafeng Yang, San Jose, CA (US); Christos Papameletis, Apex, NC (US)

(73) Assignee: Cadence Design Systems, Inc., San Jose, CA (US)

( * ) Notice: Subject to any disclaimer, the term of this patent is extended or adjusted under 35 U.S.C. 154(b) by 662 days.

(21) Appl. No.: 17/953,552

(22) Filed: Sep. 27, 2022

(51) Int. Cl.
 *G06F 30/333* (2020.01)
 *G06F 30/327* (2020.01)
 *G06F 30/392* (2020.01)
 *G06F 30/398* (2020.01)

(52) U.S. Cl.
 CPC .......... *G06F 30/333* (2020.01); *G06F 30/327* (2020.01); *G06F 30/392* (2020.01); *G06F 30/398* (2020.01)

(58) Field of Classification Search
 CPC .... G06F 30/333; G06F 30/392; G06F 30/327; G06F 30/398
 USPC ............... 716/103, 105, 122, 123, 124, 136; 703/14
 See application file for complete search history.

(56) References Cited

U.S. PATENT DOCUMENTS

| 5,410,551 | A | * | 4/1995 | Edwards | G06F 11/24 |
| | | | | | 714/E11.154 |
| 6,038,691 | A | * | 3/2000 | Nakao | G01R 31/318583 |
| | | | | | 714/733 |
| 6,311,317 | B1 | * | 10/2001 | Khoche | G06F 30/30 |
| | | | | | 716/136 |
| 6,467,051 | B1 | * | 10/2002 | Browen | G01R 31/318502 |
| | | | | | 714/724 |

(Continued)

OTHER PUBLICATIONS

Chang et al., Chinese Patent Document No. CN-111781204-A, published Oct. 16, 2020, 4 pages including abstract, claims and 1 drawing. (Year: 2020).*

*Primary Examiner* — Phallaka Kik
(74) *Attorney, Agent, or Firm* — Foley & Lardner LLP

(57) ABSTRACT

A system includes a memory that stores instructions and a processing unit that accesses the memory and executes the instructions. The instructions include an EDA application that includes a circuit layout module that generates an initial circuit layout in response to a circuit netlist. The circuit netlist includes functional logic, the test-point nodes interconnecting portions of the functional logic, and a plurality of test-point flops associated with scan-chains. The EDA application also includes a test-point flop allocation module that divides the test-point nodes into test-point sharing groups based on a physical location of the test-point nodes and based on a test-point allocation parameter. The module relocates each of the test-point flops proximal to a test-point sharing group to generate an adjusted circuit layout associated with the circuit design. The adjusted circuit layout is employable to fabricate an integrated circuit (IC) chip.

20 Claims, 6 Drawing Sheets

(56) References Cited

U.S. PATENT DOCUMENTS

| | | | | |
|---|---|---|---|---|
| 6,618,828 | B1* | 9/2003 | Armstrong | G01R 31/318547 |
| | | | | 714/E11.16 |
| 10,031,995 | B2* | 7/2018 | Haller | G06F 30/398 |
| 10,444,282 | B2* | 10/2019 | Rajski | G01R 31/318307 |
| 10,740,515 | B1* | 8/2020 | Kaur | G06F 30/333 |
| 11,947,887 | B1* | 4/2024 | Chakravadhanula | |
| | | | | G06F 30/333 |
| 2003/0200492 | A1* | 10/2003 | Nakao | G01R 31/318547 |
| | | | | 714/724 |
| 2004/0177299 | A1* | 9/2004 | Wang | G01R 31/31858 |
| | | | | 714/726 |
| 2008/0195904 | A1* | 8/2008 | Wang | G01R 31/318547 |
| | | | | 714/E11.159 |
| 2023/0039473 | A1* | 2/2023 | Du | G06F 30/398 |

* cited by examiner

PHYSICAL AWARENESS OF TEST-POINT SHARING IN A CIRCUIT DESIGN

TECHNICAL FIELD

The present description relates generally to circuit design systems, and specifically to physical awareness of test-point sharing in a circuit design.

BACKGROUND

Modern circuit designs often include dedicated testing circuitry to allow a fabricated circuit to be tested. Such dedicated testing circuitry can include scan-chains that allows multiple test-point nodes interconnecting functional logic to be monitored (e.g., via an observe test-point flop) or to be controlled (e.g., via a control test-point flop). The data on test-point nodes can thus be coupled via a scan-chain that includes the test-point flops to allow a readout of the data at all of the test-point nodes. To provide for more efficient dedicated testing circuitry, the test-point nodes can be logically coupled, such that multiple test-point nodes can be coupled to a single test-point flop. Therefore, the number of test-point flops can be reduced in a given circuit design. However, like the functional logic in the fabricated circuit corresponding to the circuit design, the test-point circuitry is physically provided in the circuit layout. Because test-points can be numerous (e.g., several thousand) and can be distributed across the physical layout of the circuit, extensive interconnect wiring between the test-point flops and the test-point nodes can be required.

SUMMARY

One example includes a system includes a memory that stores instructions and a processing unit that accesses the memory and executes the instructions. The instructions include an EDA application that includes a circuit layout module that generates an initial circuit layout in response to a circuit netlist. The circuit netlist includes functional logic, the test-point nodes interconnecting portions of the functional logic, and a plurality of test-point flops associated with scan-chains. The EDA application also includes a test-point flop allocation module that divides the test-point nodes into test-point sharing groups based on a physical location of the test-point nodes and based on a test-point allocation parameter. The module relocates each of the test-point flops proximal to a test-point sharing group to generate an adjusted circuit layout associated with the circuit design. The adjusted circuit layout is employable to fabricate an integrated circuit (IC) chip.

Another example includes a non-transitory computer readable medium having machine-readable instructions. The machine-readable instructions are executed to receive, at a circuit design tool executing on a computing platform, a circuit netlist comprising functional logic, the test-point nodes interconnecting portions of the functional logic, and test-point flops associated with scan-chains. The machine-readable instructions are also configured to generate a circuit design associated with the circuit netlist via the circuit design tool. The circuit design includes an initial circuit layout comprising a physical layout of the circuit design. The machine-readable instructions are also configured to divide the test-point nodes into a plurality of test-point sharing groups based on a physical location of test-point nodes on the initial circuit layout and based on a predetermined test-point allocation parameter via a test-point flop allocation module executing on the computing platform. The machine-readable instructions are also configured to relocate each of the test-point flops proximal to a respective one of the test-point sharing groups in the initial circuit layout of the circuit design to generate an adjusted circuit layout associated with the circuit design via the test-point flop allocation module. The adjusted circuit layout is employable to fabricate an IC chip.

Another example includes a method for allocating test-point flops in scan-chains of a circuit design. The method includes receiving, at a circuit design tool executing on a computing platform, a circuit netlist comprising functional logic, the test-point nodes interconnecting portions of the functional logic, and the test-point flops. The method also includes generating a circuit design associated with the circuit netlist via the circuit design tool, the circuit design comprising an initial circuit layout comprising a physical layout of the circuit design. The method also includes determining a longest gap between test-point nodes along two orthogonal axes associated with the initial circuit layout via a test-point flop allocation module and dividing the test-point nodes into two separate portions on either side of the longest gap via the test-point flop allocation module. Each of the two portions includes a quantity of the test-point nodes that satisfies the predetermined test-point allocation parameter. The method also includes, for a given one of the portions having a quantity of the test-point nodes that satisfies a given one quantity of the predetermined test-point allocation parameter, designating the given one of the portions to be one of a plurality of test-point sharing groups via the test-point flop allocation module. The method also includes, for a given one of the portions having a quantity of the test-point nodes that satisfies a sum of quantities of the predetermined test-point allocation parameter, determining a longest gap between two test-point nodes along each of the two orthogonal axes associated with the given one of the portions to divide the test-point nodes into two smaller portions on either side of the longest gap of the given one of the portions via the test-point flop allocation module. The method also includes iteratively repeating, via the test-point flop allocation module, determining the longest gap, dividing the test-point nodes, and designating the given one of the portions to be one of the test-point sharing groups until the iteratively smaller portions satisfy a given one quantity of the predetermined test-point allocation parameter. The method further includes relocating each of the test-point flops proximal to a respective one of the test-point sharing groups in the initial circuit layout of the circuit design to generate an adjusted circuit layout associated with the circuit design via the test-point flop allocation module. The adjusted circuit layout is employable to fabricate an IC chip.

DETAILED DESCRIPTION

Figure 1:
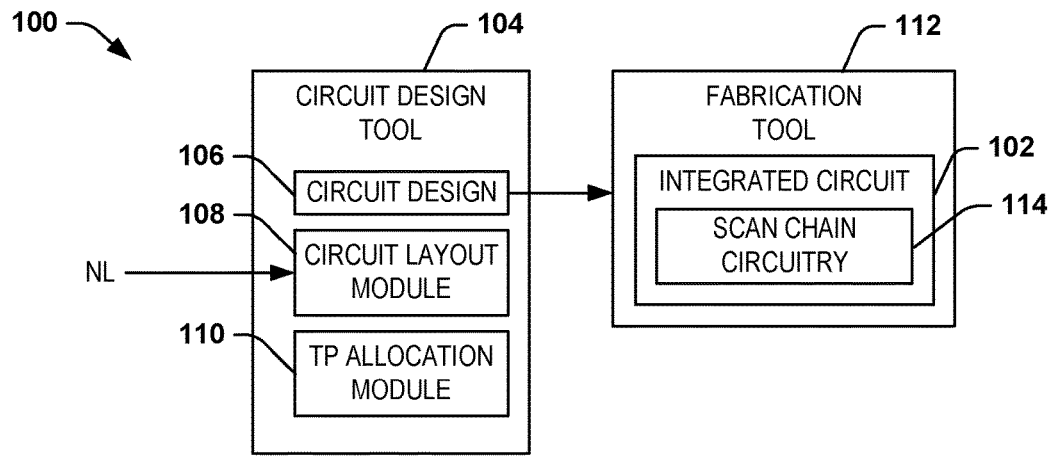
FIG. 1 illustrates an example diagram of design and fabrication of a circuit.

The present description relates generally to circuit design systems, and specifically to physical awareness of test-point sharing in a circuit design. As described herein, a test-point flop allocation module can provide the test-point flop allocation as corresponding to placement of test-point flops of scan-chains relative to the physical location of test-point nodes in a circuit design. The test-point flop allocation module can be implemented as one tool of a suite of tools in an electronic design automation (EDA) application, such as implemented in a circuit design tool. For example, a circuit design tool can include a processor and a memory that is configured to store the EDA applications. The processor can access the memory to facilitate generation of a circuit design in response to a circuit netlist (e.g., provided by a user).

As an example, the EDA applications can include a circuit layout module that is configured to generate an initial circuit layout corresponding to a physical layout of the circuit design. As an example, the circuit layout module can include a place-and-route tool to provide the physical layout and interconnects of the components of the circuit. The circuit netlist can include functional logic, test-point nodes that interconnect some of the functional logic, and test-point flops that form scan-chains. Therefore, the initial circuit layout can include a physical location of each of the test-point nodes and the test-point flops.

As an example, the test-point flop allocation module can be implemented to divide the test-point nodes into test-point sharing groups based on a physical location on the initial circuit layout. The test-point sharing groups can thus correspond to a number of test-point nodes that are logically coupled to a single test-point flop. As described in greater detail herein, the test-point flop allocation module can determine a longest gap between test-point nodes along two orthogonal axes associated with the initial circuit layout, and can divide the test-point nodes into two separate portions on either side of the longest gap. For example, each of the two portions can include a quantity of the test-point nodes that satisfies a predetermined test-point allocation parameter. The test-point allocation parameter can correspond to a designation (e.g., by a user or a customer) of a quantity of test-point sharing groups to be included in the circuit design, and the number of test-point nodes to be included in each of the test-point sharing groups. As an example, the test-point allocation parameter can be provided as part of the circuit netlist, thereby establishing a quantity of test-point flops that corresponds to the number of test-point sharing groups in the test-point allocation parameter.

For a given one of the portions of test-point nodes having a quantity of the test-point nodes that satisfies a given one quantity of the test-point allocation parameter, the test-point flop allocation module thus designates the respective portion to be one of the test-point sharing groups. For a given one of the portions having a quantity of the test-point nodes that satisfies a sum of quantities of the test-point allocation parameter, and thus a sum of test-point nodes that corresponds to multiple test-point sharing groups as designated by the test-point allocation parameter, the test-point flop allocation module can again determine a longest gap between two test-point nodes along each of the two orthogonal axes of the respective portion to divide the test-point nodes into two smaller portions on either side of the longest gap of the portion. The test-point flop allocation module can thus iteratively repeat the operations for determining the longest gap and dividing the test-point nodes into two portions until all of the test-point nodes can be designated in groups of test-point sharing nodes that satisfy the test-point allocation parameter. Accordingly, the test-point sharing groups can be grouped based on a relative proximity of test-point nodes with each other.

In response to establishing the test-point sharing groups, the test-point flop allocation module can be configured to relocate the test-point flops to generate an adjusted circuit layout. As an example, the test-point flop allocation module can determine an approximate centroid location of each of the test-point sharing groups, and can relocate a test-point flop to the approximate centroid location of each of the test-point sharing groups. The circuit layout module (e.g., the place-and-route tool) can thus adjust the location of the test-point flop and the surrounding functional logic to provide a most suitable location for the test-point flop. Therefore, as described herein, the test-point flop allocation module can relocate the test-point flops to more efficient locations in the circuit layout, thereby reducing the amount of interconnect wiring between test-point nodes and test-point flops. By reducing the interconnect wiring, the adjusted circuit layout can be implemented to fabricate an integrated circuit (IC) having a more compact design in which material costs for fabrication can be curtailed.

FIG. 1 illustrates an example diagram 100 of design and fabrication of a circuit. The diagram 100 includes functional blocks that can correspond to hardware, firmware, and/or software elements that are directed to the design and fabrication of an integrated circuit (IC) 102. The diagram 100 includes a circuit design tool 104 that is configured to facilitate generation of a circuit design 106 by a user, with the circuit design 106 corresponding to the fabricated IC 102. As an example, the circuit design tool 104 can include a suite of software tools in an electronic design automation (EDA) application. The circuit design tool 104 can be implemented on a computing system that includes a processor and a memory that is configured to store the EDA applications. The processor can access the memory to facilitate generation of the circuit design 106 in response to a circuit netlist. In the example of FIG. 1, the circuit netlist is demonstrated as an input "NL" to the circuit design tool 104.

The circuit design tool 104 includes a circuit layout module 108 and a test-point flop allocation module 110. The circuit layout module 108 can be configured as or can include a place-and-route tool that is configured to generate an initial circuit layout associated with the circuit design 106 based on the circuit netlist NL. The initial circuit layout can thus correspond to a physical layout of the components of the circuit design 106, such as including the interconnects of the components of the circuit of the circuit design 106. The circuit netlist NL can define the components to be included in the circuit design 106, including functional logic, test-point nodes that interconnect some of the functional logic, and test-point flops that are coupled to the test-point nodes and that form scan-chains. Therefore, the initial circuit layout can include a physical location of each of the test-point nodes and the test-point flops. As described in greater detail herein, the circuit netlist NL can also define a predetermined test-point allocation parameter.

Figure 2:
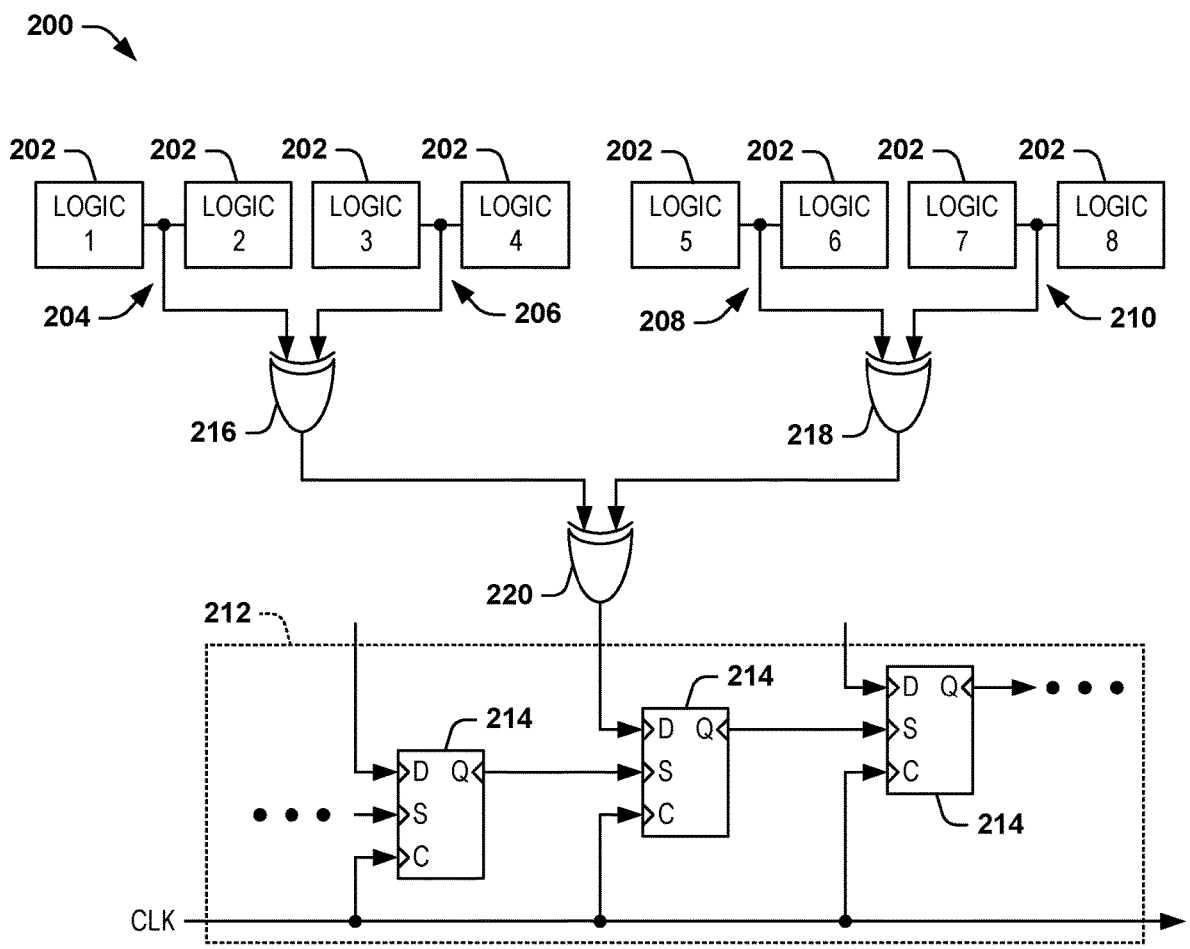
FIG. 2 illustrates an example diagram of test-point sharing for a scan-chain.

FIG. 2 illustrates an example diagram 200 of test-point sharing for a scan-chain. The diagram 200 illustrates a simplified example of the interconnection between functional logic, test-point nodes, and test-point flops of one of a plurality of scan-chains of the IC 102, such as can be provided in the circuit design 106. Therefore, in the following description of the example of FIG. 2, reference is to be made to the example of FIG. 1.

The diagram 200 includes blocks of functional logic 202, labeled as "LOGIC 1" through "LOGIC 8", that can collectively correspond to any of a variety of dedicated functionality of the IC 102 of FIG. 1. In the example of FIG. 2, there is a test-point node 204 interconnecting the first and second functional logic 202, a test-point node 206 interconnecting the third and fourth functional logic 202, a test-point node 208 interconnecting the fifth and sixth functional logic 202, and a test-point node 210 interconnecting the seventh and eighth functional logic 202. As an example, the test-point nodes 204, 206, 208, and 210 can be predefined in the circuit netlist NL. In the example of FIG. 2, the test-point nodes 204, 206, 208, and 210 are demonstrated as observe nodes that are intended to facilitate observation of the data on the test-point nodes 204, 206, 208, and 210.

The diagram 200 also includes a scan-chain 212 that is formed from a sequence of test-point flops 214. Each of the test-point flops 214 includes an output "Q", a data input "D" that receives the data from test-point nodes, a scan input "S" that receives the data from the output of a preceding test-point flop 214 in the scan-chain 212, and a clock input "C" that receives a clock signal CLK. The test-point flops 214 can also include a selection input (not shown) that facilitates selection between the data input "D" and the scan input "S", and thus between collecting data from the test-point nodes and scanning the data out for evaluation.

In the example of FIG. 2, the test-point nodes 204 and 206 are coupled to respective inputs of a first XOR gate 216, and the test-point nodes 208 and 210 are coupled to respective inputs of a second XOR gate 218. The first and second XOR gates 216 and 218 provide outputs that correspond to respective inputs of a third XOR gate 220. The third XOR gate 220 provides an output to the data input "D" of one of the test-point flops 214. Therefore, the test-point flop 214 receives an input that is shared among the test-point nodes 204, 206, 208, and 210. In this manner, the test-point nodes 204, 206, 208, and 210 can correspond to a single test-point sharing group, as described herein.

Each of the test-point flops 214 in the scan-chain 212 can receive an input at the data input "D" associated with multiple test-point nodes, similar to as described above. Additionally, the scan-chain 212 can include a great many test-point flops 214 arranged sequentially, thus providing data monitoring of hundreds or thousands of test-point nodes. While the example of FIG. 2 demonstrates observe nodes that are intended to facilitate observation of the data on the test-point nodes, the techniques described herein can apply similarly or equally to allocation of test-point control nodes that are configured to force data into the functional logic 202, as well.

As described above, the test-point nodes 204, 206, 208, and 210 can be specified in the circuit netlist NL. As an example, the circuit netlist NL can include a predetermined test-point allocation parameter. The test-point allocation parameter can correspond to a designation (e.g., by a user or a customer) of a quantity of test-point sharing groups to be included in the circuit design 106, and the quantity of test-point nodes to be included in each of the test-point sharing groups. The test-point allocation parameter can thus also dictate the quantity of test-point flops 214 to be included in the circuit design 106, such as one test-point flop 214 per test-point sharing group. Therefore, based on the definition of the test-point nodes (e.g., including the test-point nodes 204, 206, 208, and 210) in the circuit netlist, and based on the test-point sharing of multiple test-points to a single test-point flop 214, the circuit netlist NL can therefore further specify the number of test-point flops 214 and XOR gates (e.g., including the XOR gates 216, 218, and 220) in the circuit design 106. Accordingly, the specification of the test-point nodes, the test-point flops, and the XOR gates can be agnostic as to physical location on the initial circuit layout of the circuit design in the circuit netlist NL.

Referring back to the example of FIG. 1, as described above, the circuit layout module 108 can generate an initial circuit layout associated with the circuit design 106 based on the circuit netlist NL. The initial circuit layout can thus correspond to a physical layout of the components of the circuit design 106, including the locations of the test-point nodes, the test-point flops, and the associated XOR gates. Therefore, based on the ordering of components (e.g., functional tiers) in the circuit netlist NL, the circuit layout module 108 can provide the physical layout in an inefficient manner with respect to the locations of the test-point flops relative to the test-point nodes. Such inefficient locations can provide for test-point nodes that are electrically coupled (e.g., via the XOR gates) to test-point flops that are located at far distances across the initial circuit layout, and such that the test-point nodes in a test-point sharing group can be scattered across the initial circuit layout. Therefore, wiring congestion can be problematic for such an inefficient arrangement when fabricating the IC 102, with such wiring congestion resulting in excessive material costs and space limitations on the IC chip 102.

To provide for a more efficient arrangement of the test-point flops on the IC chip 102, the test-point flop allocation module 110 is configured to allocate the test-point flops in a more efficient manner. The test-point flop allocation module 110 can be implemented to divide the test-point nodes into the test-point sharing groups based on a physical location on the initial circuit layout. The test-point sharing groups can thus correspond to a number of test-point nodes that are logically coupled (e.g., via XOR gates) to a single test-point flop. As an example, the test-point flop allocation module 110 can determine a longest gap between test-point nodes along two orthogonal axes associated with the initial circuit layout, and can divide the test-point nodes into two separate portions on either side of the longest gap. For example, each of the two portions can include a quantity of the test-point nodes that satisfies a predetermined test-point allocation parameter. As described herein, the satisfying the predetermined test-point allocation parameter describes that a given portion includes a quantity of test-point nodes that is equal to a sum of the quantity of test-point nodes in one or more of the designated test-point sharing groups, as specified by the test-point allocation parameter.

For a given one of the portions of test-point nodes having a quantity of the test-point nodes that satisfies a given one quantity of the test-point allocation parameter, the test-point flop allocation module 110 thus designates the respective portion to be one of the test-point sharing groups. For a given one of the portions having a quantity of the test-point nodes that satisfies a sum of quantities of the test-point allocation parameter, and thus a sum of test-point nodes that corresponds to multiple test-point sharing groups as designated by the test-point allocation parameter, the test-point flop allocation module 110 can again determine a longest gap between two test-point nodes along each of the two orthogonal axes of the respective portion to divide the test-point nodes of the group into two smaller portions that each satisfy the test-point allocation parameter. The test-point flop allocation module 110 can thus iteratively repeat the operations for determining the longest gap and dividing the test-point nodes into two portions until all of the test-point nodes can be designated in groups of test-point sharing nodes that satisfy the test-point allocation parameter. Accordingly, the test-point sharing groups can be grouped based on a relative proximity of test-point nodes with each other.

In response to establishing the test-point sharing groups, the test-point flop allocation module 110 can be configured to relocate the test-point flops to generate an adjusted circuit layout of the circuit design 106. As an example, the test-point flop allocation module 110 can determine an approximate centroid location of each of the test-point sharing groups, and can relocate a test-point flop to the approximate centroid location of each of the test-point sharing groups. The circuit layout module 108 (e.g., the place-and-route tool) can thus adjust the location of the test-point flop and the surrounding functional logic to provide a most suitable location for the test-point flop. The circuit layout module 108 (e.g., the place-and-route tool) can likewise relocate the associated XOR gates implemented in the test-point sharing to proximal positions between the test-point nodes and the relocated test-point flops.

In the example of FIG. 1, the circuit design 106 that includes the adjusted circuit layout is provided to a fabrication tool 112 that is configured to fabricate the IC 102. The fabricated IC 102 can thus have a physical layout that corresponds to the adjusted circuit layout of the circuit design 106. In the example of FIG. 1, the IC 102 includes scan-chain circuitry 114 that includes the relocated test-point flops and the associated respective XOR gates. Therefore, the test-point flops can have locations on the IC 102 that is more efficient than a typical fabricated IC to reduce the congestion of interconnect wiring between test-point nodes and test-point flops. Accordingly, the IC 102 can have a more compact design in which fabrication material costs are curtailed.

FIGS. 3-8 describe the test-point flop allocation module 110 in more detail. In the following description of the examples of FIGS. 3-8 reference is to be made to the examples of FIGS. 1 and 2.

Figure 3:
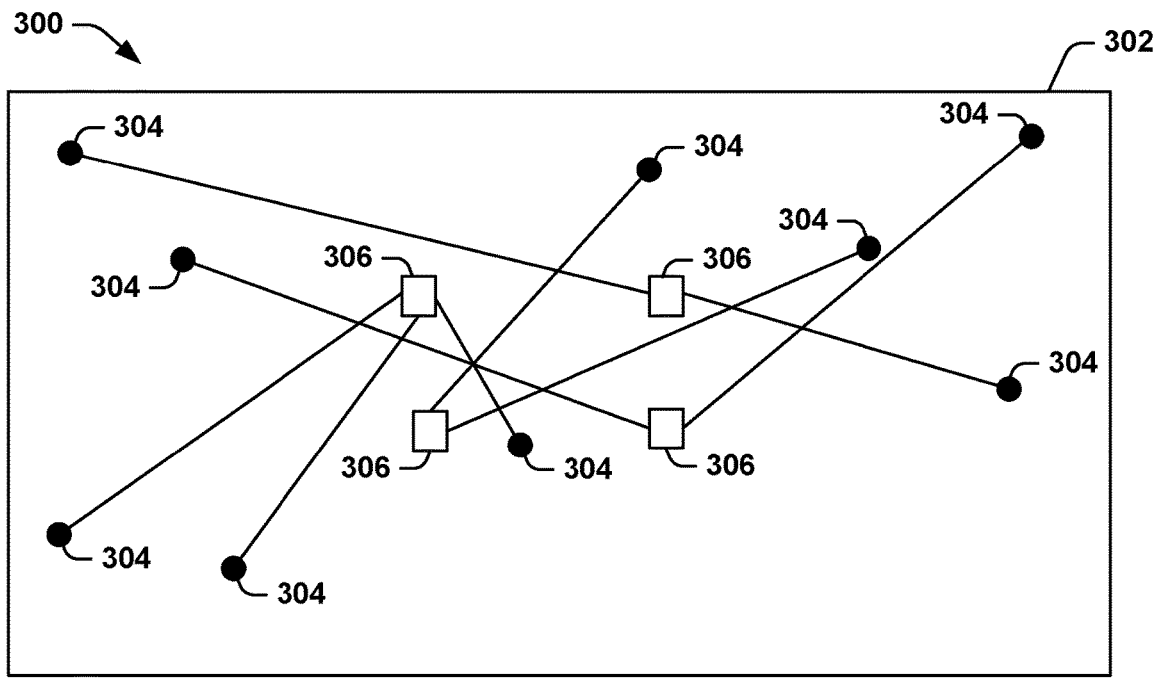
FIG. 3 illustrates an example of an initial circuit layout of a circuit design.

FIG. 3 illustrates an example diagram of an initial circuit layout 300 of a circuit design 106. The circuit layout 300 can correspond to an initial circuit layout of the circuit design 106, as generated by the circuit layout module 108 of the circuit design tool 104. The circuit layout 300 is demonstrated as a two-dimensional area 302 representing a semiconductor die that includes a physical location of test-point nodes 304 and test-point flops 306. In the examples of FIGS. 3-8, the remaining circuit components (e.g., the functional logic) are not shown for the sake of simplicity.

As described above, the test-point nodes 304 and the test-point flops 306 can be included in the circuit netlist NL. Thus, the designer of the circuit design 106 can be agnostic as to the resulting physical locations of the test-point nodes 304 and the test-point flops 306 at the time of creating the circuit netlist NL. The circuit layout module 108 thus generates the initial circuit layout from the circuit netlist NL in which the physical layout of the test-point nodes 304 and the test-point flops 306 are allocated by the circuit layout module 108 based on any of a variety of predefined protocols of the circuit layout module 108 (e.g., functional tiers).

In the following examples of FIGS. 3-8, the initial circuit layout 300 includes nine test-point nodes 304 and four test-point flops 306, as dictated by the circuit netlist NL. Therefore, the circuit netlist NL can have a predetermined test-point allocation parameter that dictates four test-point sharing groups, one for each of the test-point flops 306. As an example, the test-point nodes 304 can be distributed in the test-point sharing groups, as dictated by the test-point allocation parameter, as equally as possible. Therefore, the test-point allocation parameter can establish a first test-point sharing group that includes two test-point nodes 304, a second test-point sharing group that includes two test-point nodes 304, a third test-point sharing group that includes two test-point nodes 304, and a fourth test-point sharing group that includes three test-point nodes 304. Thus, each of the test-point sharing groups can be logically coupled via XOR gates to a respective one of the test-point flops 306. The example of FIG. 3 demonstrates only nine test-point nodes 304 and four test-point flops 306 by simplistic example, such that a given circuit design 106 can instead include hundreds or thousands of test-point nodes 304 and hundreds of test-point flops 306.

As described above, based on the ordering of components (e.g., functional tiers) in the circuit netlist NL, the circuit layout module 108 can provide the physical layout in an inefficient manner with respect to the locations of the test-point flops relative to the test-point nodes. The example of FIG. 3 demonstrates such an inefficient allocation of the test-point nodes 304 relative to the test-point flops 306 with respect to the wiring interconnects between the test-point nodes 304 and the test-point flops 306. As demonstrated in the example of FIG. 3, the inefficient allocation of the test-point nodes 304 relative to the test-point flops 306 on the initial circuit layout 300 results in electrical coupling of the test-point nodes 304 (e.g., via the XOR gates, not shown in the examples of FIGS. 3-8) to the test-point flops 306 located at far distances across the initial circuit layout 300. In the example of FIG. 3, the test-point nodes 304 are arranged in test-point sharing groups that are not based on proximal coupling of the test-point nodes 304, but are instead based on an arrangement in which the test-point nodes 304 are disparate in physical location. Therefore, the initial circuit layout 300 can result in wiring congestion that can result in excessive material costs and space limitations on the resultant IC chip 102.

Figure 4:
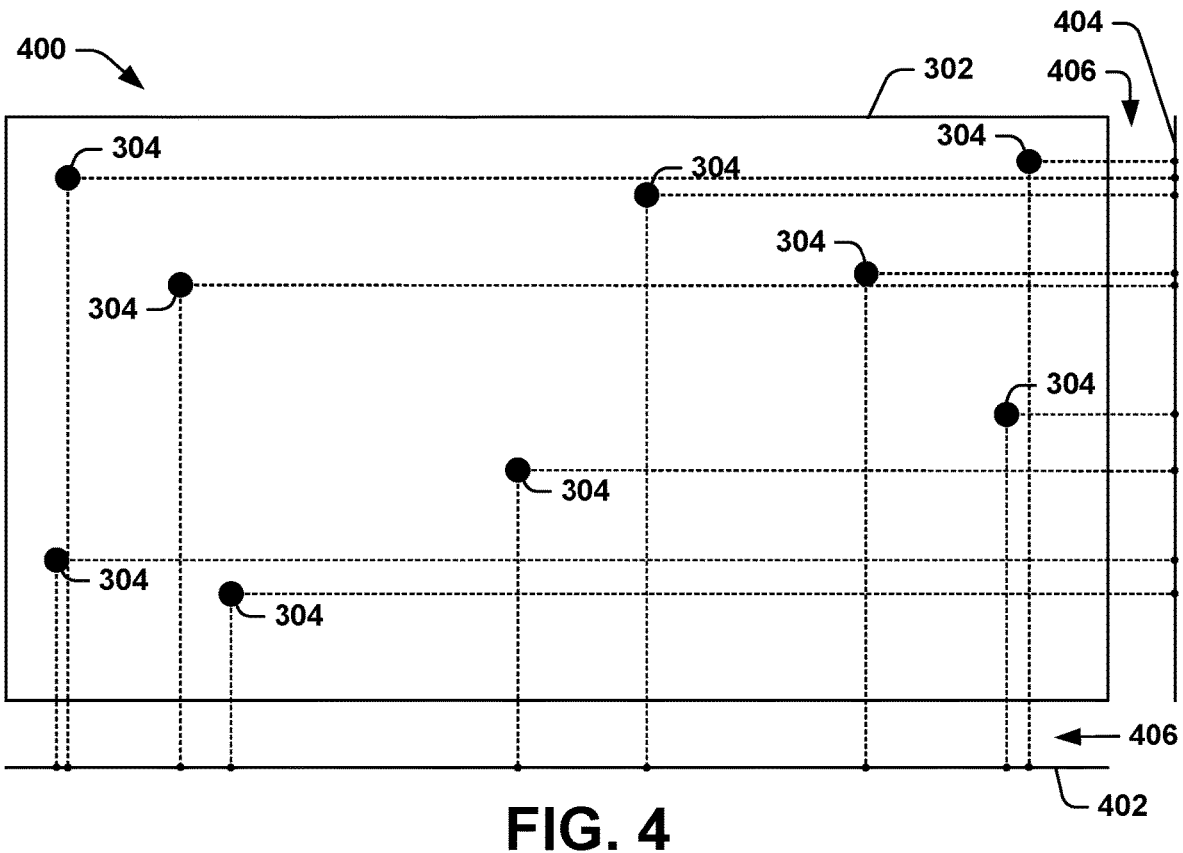
FIG. 4 illustrates a first example diagram of dividing test-point nodes.

To mitigate the wiring congestion demonstrated in the initial circuit layout 300, the test-point flop allocation module 110 can divide the test nodes 304 into more optimal test-point sharing groups and can relocate the test-point flops 306. FIG. 4 illustrates a first example diagram 400 of dividing test-point nodes. In the example of FIG. 4, the diagram 400 demonstrates only the test-point nodes 304 for simplicity. As an example, the test-point flop allocation module 110 can preserve the test-point nodes 304 specified by the circuit netlist NL, and can preserve the physical location of the test-point nodes 304 on the initial circuit layout 300. Thus, the test-point flop allocation module 110 can begin by identifying the physical location of the test-point nodes 304 in the initial circuit layout 300.

For example, the test-point flop allocation module 110 identifies the physical location of the test-point nodes 304 by generating a one-dimensional location array of locations of the test-point nodes 304 along each orthogonal length of the initial circuit layout 300. In the example of FIG. 4, the test-point flop allocation module 110 can generate a first one-dimensional array 402 that extends along a first orthogonal length (e.g., an X-axis) of the two-dimensional area 302 and a second one-dimensional array 404 that extends along a second orthogonal length (e.g., a Y-axis) of the two-dimensional area 302. The physical locations of the test-point nodes 304 are thus mapped to each of the one-dimensional arrays 402 and 404, as demonstrated by dotted lines 406.

Figure 5:
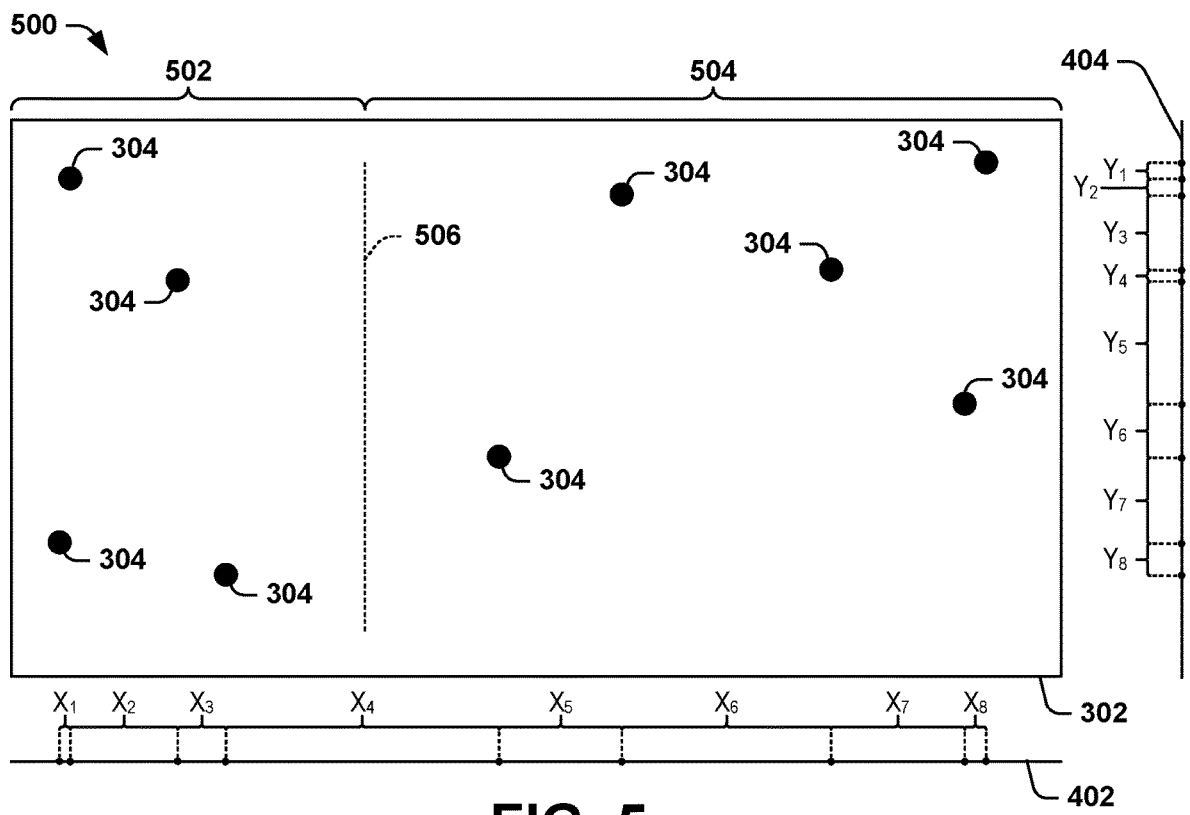
FIG. 5 illustrates a second example diagram of dividing test-point nodes.

FIG. 5 illustrates a second example diagram 500 of dividing test-point nodes. Similar to as described above in the example of FIG. 4, in the example of FIG. 5, the diagram 500 demonstrates only the test-point nodes 304 for simplicity. Upon generating the one-dimensional arrays 402 and 404, the test-point flop allocation module 110 is configured to determine a longest gap between test-point nodes 304 along the one-dimensional arrays 402 and 404. In the example of FIG. 5, the test-point flop allocation module 110 determines a length between each adjacent pair of test-point nodes 304 represented in each of the one-dimensional arrays 402 and 404. The test-point flop allocation module 110 thus determines lengths $X_1$ through $X_8$ between adjacent pairs of test-point nodes 304 along the first one-dimensional array 402 and lengths $Y_1$ through $Y_8$ between adjacent pairs of test-point nodes 304 along the second one-dimensional array 404.

After determining the lengths $X_1$ through $X_8$ and $Y_1$ through $Y_8$, the test-point flop allocation module 110 determines which of the lengths $X_1$ through $X_8$ and $Y_1$ through $Y_8$ is the longest, and thus corresponds to a longest gap between test-point nodes 304 along the one-dimensional arrays 402 and 404. In evaluating which of the lengths $X_1$ through $X_8$ and $Y_1$ through $Y_8$ is the longest, in the example of FIG. 5, the test-point flop allocation module 110 determines that the length $X_4$ is the longest gap between any two test-point nodes 304 along each of the one-dimensional arrays 402 and 404. In determining the longest gap, the test-point flop allocation module 110 can likewise ensure that the quantity of test-point nodes 304 on either side of the longest gap satisfies a quantity of test-point nodes specified by the predetermined test-point allocation parameter. For example, the test-point flop allocation module 110 can determine if the number of test-point nodes 304 on either side of the longest gap is equal to a sum of the quantities of test-point nodes specified by the test-point sharing groups established by the test-point allocation parameter.

In the example of FIG. 5, after determining that the length $X_4$ is the longest gap between any two test-point nodes 304 along each of the one-dimensional arrays 402 and 404, the test-point flop allocation module 110 determines whether the test-point nodes 304 on either side of the length $X_4$ satisfies the test-point allocation parameter. In the example of FIG. 5, the test-point flop allocation module 110 identifies that there are four test-point nodes 306 on one side (e.g., to the left) of the length $X_4$ and five test-point nodes on the other side (e.g., to the right) of the length $X_4$. As described above, the test-point allocation parameter in the examples of FIGS. 3-8 specifies four test-point sharing groups of two, two, two, and three test-point nodes 304 respectively. Therefore, the quantity of test-point nodes 304 on the one side of the length $X_4$ satisfies the test-point allocation parameter based on a quantity of two of the test-point sharing groups (e.g., with two and two test-point nodes 304, respectively). Similarly, the quantity of test-point nodes 304 on the other side of the length $X_4$ satisfies the test-point allocation parameter based on a quantity of two of the test-point sharing groups (e.g., with two and three test-point nodes 304, respectively).

Upon determining that the length $X_4$ is the longest gap between any two test-point nodes 304 along each of the one-dimensional arrays 402 and 404, and upon determining that the quantity of test-point nodes 304 on either side of the length $X_4$ satisfy the test-point allocation parameter, the test-point flop allocation module 110 can divide the test-point nodes 304 into two portions. The two portions are identified in the example of FIG. 5 as a first portion 502 (having four test-point nodes 304) and a second portion 504 (having five test-point nodes 304). The division of the test-point nodes 304 is represented in the example of FIG. 5 by a dividing line 506. However, if the test-point flop allocation module 110 determines that the quantity of test-point nodes 304 on either side of the longest gap does not satisfy the test-point allocation parameter, the test-point flop allocation module 110 can iteratively determine the next longest gap between the test-point nodes along each of the one-dimensional arrays 402 and 404 and if the test-point nodes 304 on either side of the next longest gap satisfy the test-point allocation parameter, etc., until the number of test-point nodes 304 on either side of a next longest gap satisfies the test-point allocation parameter.

Figure 6:
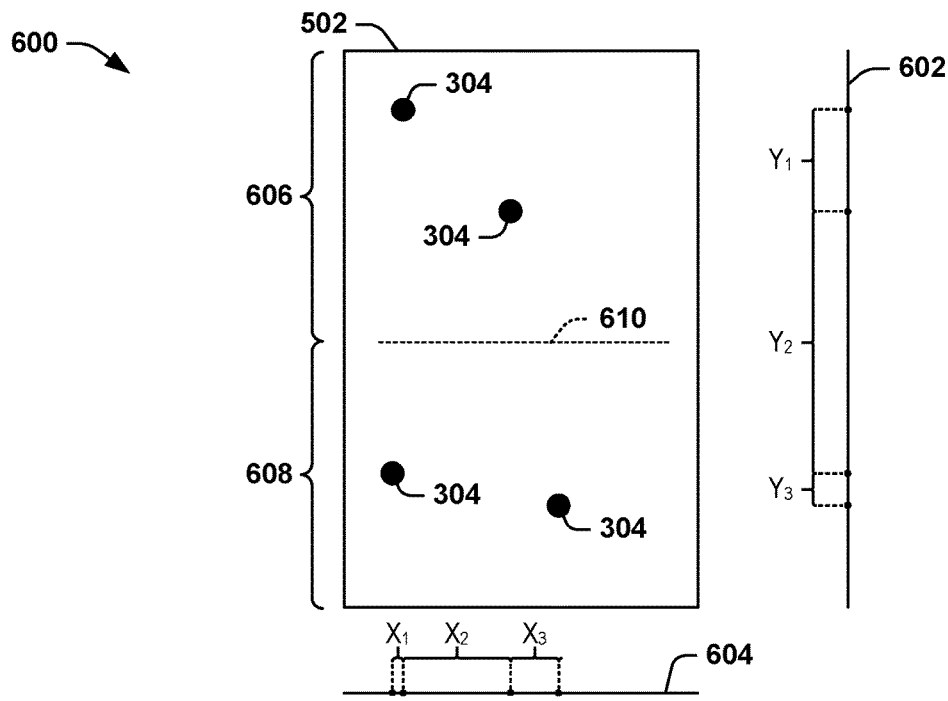
FIG. 6 illustrates a third example diagram of dividing test-point nodes.
Figure 7:
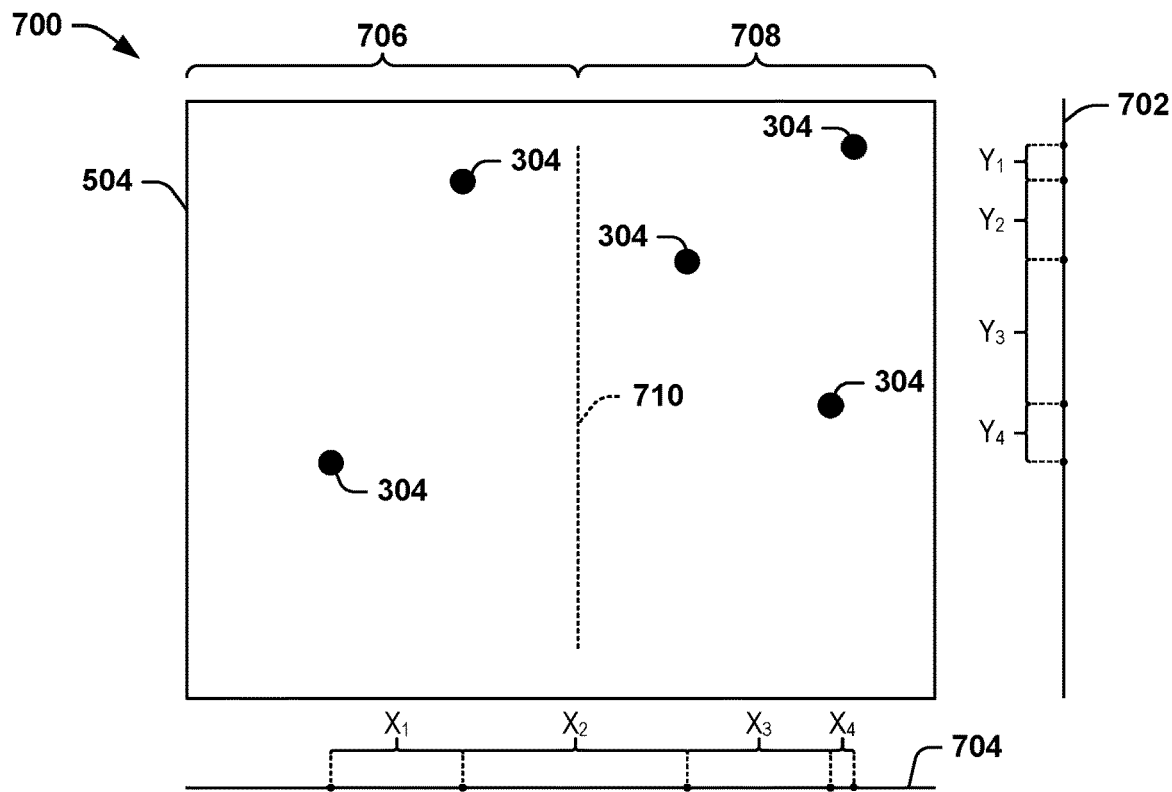
FIG. 7 illustrates a fourth example diagram of dividing test-point nodes.

The division of the test-point nodes 304 can iteratively continue in each portion established by the test-point flop allocation module 110 until the quantity of test-point nodes 304 on each side of a longest gap between test-point nodes 304 in a given portion is equal to a quantity of test-point nodes of a given test-point sharing group identified in the test-point allocation parameter, as demonstrated in the examples of FIGS. 6 and 7. FIG. 6 illustrates a third example diagram 600 of dividing test-point nodes. Similar to as described above in the examples of FIGS. 4 and 5, in the example of FIG. 6, the diagram 600 demonstrates only the test-point nodes 304 for simplicity.

In the example of FIG. 6, the test-point flop allocation module 110 continues to divide the test-point nodes 304 in the first portion 502. The test-point flop allocation module 110 identifies the physical location of the test-point nodes 304 in the first portion 502 by generating a one-dimensional location array of locations of the test-point nodes 304 along each orthogonal length of the first portion 502. In the example of FIG. 6, the test-point flop allocation module 110 can generate a first one-dimensional array 602 that extends along a first orthogonal length (e.g., an X-axis) of the first portion 502 and a second one-dimensional array 604 that extends along a second orthogonal length (e.g., a Y-axis) of the first portion 502.

Upon generating the one-dimensional arrays 602 and 604, the test-point flop allocation module 110 is configured to determine a longest gap between test-point nodes 304 along the one-dimensional arrays 602 and 604. In the example of FIG. 6, the test-point flop allocation module 110 determines a length between each adjacent pair of test-point nodes 304 represented in each of the one-dimensional arrays 602 and 604. The test-point flop allocation module 110 thus determines lengths $X_1$ through $X_3$ between adjacent pairs of test-point nodes 304 along the first one-dimensional array 602 and lengths $Y_1$ through $Y_3$ between adjacent pairs of test-point nodes 304 along the second one-dimensional array 604.

After determining the lengths $X_1$ through $X_3$ and $Y_1$ through $Y_3$, the test-point flop allocation module 110 determines which of the lengths $X_1$ through $X_3$ and $Y_1$ through $Y_3$ is the longest, and thus corresponds to a longest gap between test-point nodes 304 along the one-dimensional arrays 602 and 604. In evaluating which of the lengths $X_1$ through $X_3$ and $Y_1$ through $Y_3$ is the longest, in the example of FIG. 6, the test-point flop allocation module 110 determines that the length $Y_2$ is the longest gap between any two test-point nodes 304 along each of the one-dimensional arrays 602 and 604. Similar to as described above, in determining the longest gap, the test-point flop allocation module 110 can likewise ensure that the quantity of test-point nodes 304 on either side of the longest gap satisfies a quantity of test-point nodes specified by the predetermined test-point allocation parameter.

In the example of FIG. 6, after determining that the length $Y_2$ is the longest gap between any two test-point nodes 304 along each of the one-dimensional arrays 602 and 604, the test-point flop allocation module 110 determines whether the test-point nodes 304 on either side of the length $Y_2$ satisfies the test-point allocation parameter. In the example of FIG. 6, the test-point flop allocation module 110 identifies that there are two test-point nodes 306 on one side of (e.g., above) the length $Y_2$ and two test-point nodes on the other side of (e.g., below) the length $Y_2$. As described above, the test-point allocation parameter in the examples of FIGS. 3-8 specifies four test-point sharing groups of two, two, two, and three test-point nodes 304 respectively. Therefore, the quantity of test-point nodes 304 on the one side of the length $Y_2$ satisfies the test-point allocation parameter based on a quantity of test-point nodes 304 being equal to the quantity of test-point nodes in one of the test-point sharing groups (e.g., two test-point nodes 304). Similarly, the quantity of test-point nodes 304 on the other side of the length $Y_2$ satisfies the test-point allocation parameter based on a quantity of test-point nodes 304 being equal to the quantity of test-point nodes in another one of the test-point sharing groups (e.g., two test-point nodes 304).

Upon determining that the length $Y_2$ is the longest gap between any two test-point nodes 304 along each of the one-dimensional arrays 602 and 604, and upon determining that the quantity of test-point nodes 304 on either side of the length $Y_2$ satisfy the test-point allocation parameter, the test-point flop allocation module 110 can divide the test-point nodes 304 into two portions. The two portions are identified in the example of FIG. 6 as a first portion 606 (having two test-point nodes 304) and a second portion 608 (having five test-point nodes 304). The division of the test-point nodes 304 is represented in the example of FIG. 6 by a dividing line 610. Similar to as described above, if the test-point flop allocation module 110 determines that the quantity of test-point nodes 304 on either side of the longest gap does not satisfy the test-point allocation parameter, the test-point flop allocation module 110 can iteratively determine the next longest gap between the test-point nodes along each of the one-dimensional arrays 602 and 604 and if the test-point nodes 304 on either side of the next longest gap satisfy the test-point allocation parameter, etc., until the number of test-point nodes 304 on either side of a next longest gap satisfies the test-point allocation parameter.

In the example of FIG. 6, because the quantity of test-point nodes 304 in the first portion 606 is equal to the quantity of test-point nodes in one of the test-point sharing groups defined by the test-point allocation parameter (e.g., two test-point nodes 304), the test-point flop allocation module 110 can designate the first portion 606 as a respective one of the test-point sharing groups. Similarly, because the quantity of test-point nodes 304 in the second portion 608 is equal to the quantity of test-point nodes in one of the test-point sharing groups defined by the test-point allocation parameter (e.g., two test-point nodes 304), the test-point flop allocation module 110 can designate the first portion 606 as a respective one of the test-point sharing groups. However, if either of the first and second portions 606 and 608 had a quantity of test-point nodes 304 that was a sum of test-point nodes 304 in multiple test-point sharing groups, the test-point flop allocation module 110 could iteratively divide the respective one or both of the first and second portions 606 and 608 again, as described above in the example of FIG. 6.

FIG. 7 illustrates a third example diagram 700 of dividing test-point nodes. Similar to as described above in the examples of FIGS. 4-6, in the example of FIG. 7, the diagram 700 demonstrates only the test-point nodes 304 for simplicity.

In the example of FIG. 7, the test-point flop allocation module 110 continues to divide the test-point nodes 304 in the second portion 504. The test-point flop allocation module 110 identifies the physical location of the test-point nodes 304 in the second portion 504 by generating a one-dimensional location array of locations of the test-point nodes 304 along each orthogonal length of the second portion 504. In the example of FIG. 7, the test-point flop allocation module 110 can generate a first one-dimensional array 702 that extends along a first orthogonal length (e.g., an X-axis) of the second portion 504 and a second one-dimensional array 704 that extends along a second orthogonal length (e.g., a Y-axis) of the second portion 504.

Upon generating the one-dimensional arrays 702 and 704, the test-point flop allocation module 110 is configured to determine a longest gap between test-point nodes 304 along the one-dimensional arrays 702 and 704. In the example of FIG. 7, the test-point flop allocation module 110 determines a length between each adjacent pair of test-point nodes 304 represented in each of the one-dimensional arrays 702 and 704. The test-point flop allocation module 110 thus determines lengths $X_1$ through $X_4$ between adjacent pairs of test-point nodes 304 along the first one-dimensional array 702 and lengths $Y_1$ through $Y_4$ between adjacent pairs of test-point nodes 304 along the second one-dimensional array 704.

After determining the lengths $X_1$ through $X_4$ and $Y_1$ through $Y_4$, the test-point flop allocation module 110 determines which of the lengths $X_1$ through $X_4$ and $Y_1$ through $Y_4$ is the longest, and thus corresponds to a longest gap between test-point nodes 304 along the one-dimensional arrays 702 and 704. In evaluating which of the lengths $X_1$ through $X_4$ and $Y_1$ through $Y_4$ is the longest, in the example of FIG. 7, the test-point flop allocation module 110 determines that the length $X_2$ is the longest gap between any two test-point nodes 304 along each of the one-dimensional arrays 702 and 704. Similar to as described above, in determining the longest gap, the test-point flop allocation module 110 can likewise ensure that the quantity of test-point nodes 304 on either side of the longest gap satisfies a quantity of test-point nodes specified by the predetermined test-point allocation parameter.

In the example of FIG. 7, after determining that the length $X_2$ is the longest gap between any two test-point nodes 304 along each of the one-dimensional arrays 702 and 704, the test-point flop allocation module 110 determines whether the test-point nodes 304 on either side of the length $Y_2$ satisfies the test-point allocation parameter. In the example of FIG. 7, the test-point flop allocation module 110 identifies that there are two test-point nodes 306 on one side (e.g., to the left) of the length $X_2$ and three test-point nodes on the other side (e.g., to the right) of the length $X_2$. As described above, the test-point allocation parameter in the examples of FIGS. 3-8 specifies four test-point sharing groups of two, two, two, and three test-point nodes 304 respectively. Therefore, the quantity of test-point nodes 304 on the one side of the length $Y_2$ satisfies the test-point allocation parameter based on a quantity of test-point nodes 304 being equal to the quantity of test-point nodes in one of the test-point sharing groups (e.g., two test-point nodes 304). Similarly, the quantity of test-point nodes 304 on the other side of the length $Y_2$ satisfies the test-point allocation parameter based on a quantity of test-point nodes 304 being equal to the quantity of test-point nodes in another one of the test-point sharing groups (e.g., three test-point nodes 304).

Upon determining that the length $X_2$ is the longest gap between any two test-point nodes 304 along each of the one-dimensional arrays 702 and 704, and upon determining that the quantity of test-point nodes 304 on either side of the length $Y_2$ satisfy the test-point allocation parameter, the test-point flop allocation module 110 can divide the test-point nodes 304 into two portions. The two portions are identified in the example of FIG. 7 as a first portion 706 (having two test-point nodes 304) and a second portion 708 (having five test-point nodes 304). The division of the test-point nodes 304 is represented in the example of FIG. 7 by a dividing line 710. Similar to as described above, if the test-point flop allocation module 110 determines that the quantity of test-point nodes 304 on either side of the longest gap does not satisfy the test-point allocation parameter, the test-point flop allocation module 110 can iteratively determine the next longest gap between the test-point nodes along each of the one-dimensional arrays 702 and 704 and if the test-point nodes 304 on either side of the next longest gap satisfy the test-point allocation parameter, etc., until the number of test-point nodes 304 on either side of a next longest gap satisfies the test-point allocation parameter.

In the example of FIG. 7, because the quantity of test-point nodes 304 in the first portion 706 is equal to the quantity of test-point nodes in one of the test-point sharing groups defined by the test-point allocation parameter (e.g., two test-point nodes 304), the test-point flop allocation module 110 can designate the first portion 706 as a respective one of the test-point sharing groups. Similarly, because the quantity of test-point nodes 304 in the second portion 708 is equal to the quantity of test-point nodes in one of the test-point sharing groups defined by the test-point allocation parameter (e.g., three test-point nodes 304), the test-point flop allocation module 110 can designate the first portion 706 as a respective one of the test-point sharing groups. However, if either of the first and second portions 706 and 708 had a quantity of test-point nodes 304 that was a sum of test-point nodes 304 in multiple test-point sharing groups, the test-point flop allocation module 110 could iteratively divide the respective one or both of the first and second portions 706 and 708 again, as described above in the example of FIG. 7.

The examples of FIGS. 4-7 demonstrate the manner in which the test-point flop allocation module 110 iteratively divides the test-point sharing groups into proximal groups of test-point nodes 304. Upon designating all of the divided groups of test-point nodes 304 into respective test-point sharing groups, the test-point flop allocation module 110 can relocate the test-point flops 306.

Figure 8:
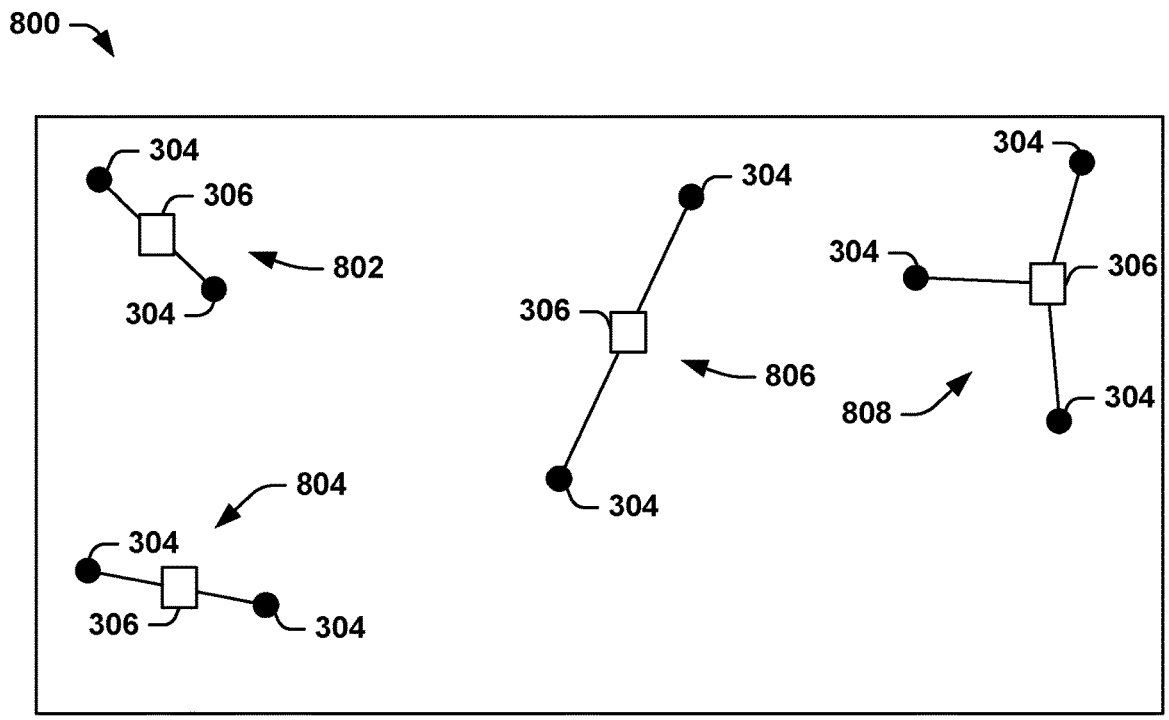
FIG. 8 illustrates an example diagram of relocating test-point flops.

FIG. 8 illustrates an example diagram 800 of relocating the test-point flops 306. The diagram 800 demonstrates the test-point nodes 304 in the same physical location as provided by the circuit layout module 108 in the initial circuit layout 300. However, the diagram 800 demonstrates the test-point flops 306 having been relocated by the test-point flop allocation module 110 based on the designation of the test-point nodes 304 in the test-point sharing groups. The diagram 800 thus demonstrates a first test-point sharing group 802 corresponding to the first portion 606 in the example of FIG. 6, a second test-point sharing group 804 corresponding to the second portion 608 in the example of FIG. 6, a third test-point sharing group 806 corresponding to the first portion 706 in the example of FIG. 7, and a fourth test-point sharing group 808 corresponding to the second portion 608 in the example of FIG. 7.

The diagram 800 includes the test-point flops 306 having been relocated proximal to the respective test-point sharing groups 802, 804, 806, and 808. As an example, upon designating the test-point nodes 304 to the respective test-point sharing groups 802, 804, 806, and 808, as described above in the examples of FIGS. 4-7, the test-point flop allocation module 110 can determine an approximate centroid location of each of the test-point sharing groups 802, 804, 806, and 808 in two-dimensional space. The test-point flop allocation module 110 can thus relocate a given one of the test-point flops 306 to the approximate centroid location for each of the test-point sharing groups 802, 804, 806, and 808. As an example, the test-point flop allocation module 110 can determine which of the test-point flops 306 in the initial circuit layout 300 is most proximal to each of the approximate centroid locations of the test-point sharing groups 802, 804, 806, and 808, and can relocate the respective most proximal test-point flops 306 to the approximate centroid locations of the respective test-point sharing groups 802, 804, 806, and 808.

Upon relocating the test-point flops 306, the circuit layout module 108 can adjust the locations of each of the test-point flops 306 and surrounding functional logic to fit the relocated test-point flops 306. For example, while the functional logic is not demonstrated in the examples of FIGS. 3-8, the initial circuit layout 300 is filled with the functional logic, as provided by the circuit layout module 108 from the circuit netlist NL. Therefore, when the test-point flops 306 are relocated, it is very highly likely that the relocated position of the test-point flops 306 would overlap existing functional logic. Accordingly, the circuit layout module 108 (e.g., an associated place-and-route tool) would provide minor adjustments to the locations of the functional logic and/or the test-point flops 306 to facilitate the relocation of the test-point flops 306 to the approximate centroid locations of the test-point sharing groups 802, 804, 806, and 808. Similarly, the XOR gates (not shown) that provide the conductive coupling of the test-point nodes 304 to the test-point flops 306 would likewise be relocated and adjusted by the circuit layout module 108.

Upon relocating and adjusting the test-point flops 306 and associated logic (e.g., the XOR gates), the circuit layout module 108 can then provide the wiring interconnect between all of the test-point flops 306 to form the associated scan-chain (e.g., the scan-chain 212). Accordingly, after relocating, adjusting, and rewiring the test-point flops 306 and associated logic (e.g., the XOR gates), the circuit layout module 108 can provide the circuit layout as an adjusted circuit layout. The diagram 800 thus demonstrates the wiring interconnects between the test-point nodes 304 and the test-point flops 306 in a manner that is significantly more efficient than the wiring interconnects between the test-point nodes 304 and the test-point flops 306 demonstrated by the initial circuit layout 300 in the example of FIG. 3. In the example of FIG. 8, the more efficient allocation of the test-point nodes 304 relative to the test-point flops 306 based on the algorithm implemented by the test-point flop allocation module 110 results in electrical coupling of the test-point nodes 304 to the test-point flops 306 at significantly more proximal distances than in the initial circuit layout 300. The adjusted circuit layout can thus be exported for fabrication of the associated IC 102. Accordingly, the adjusted circuit layout in the diagram 800 can result in significantly less wiring congestion, resulting in a reduction in material costs and in a more compact design of the resultant IC chip 102.

Figure 9:
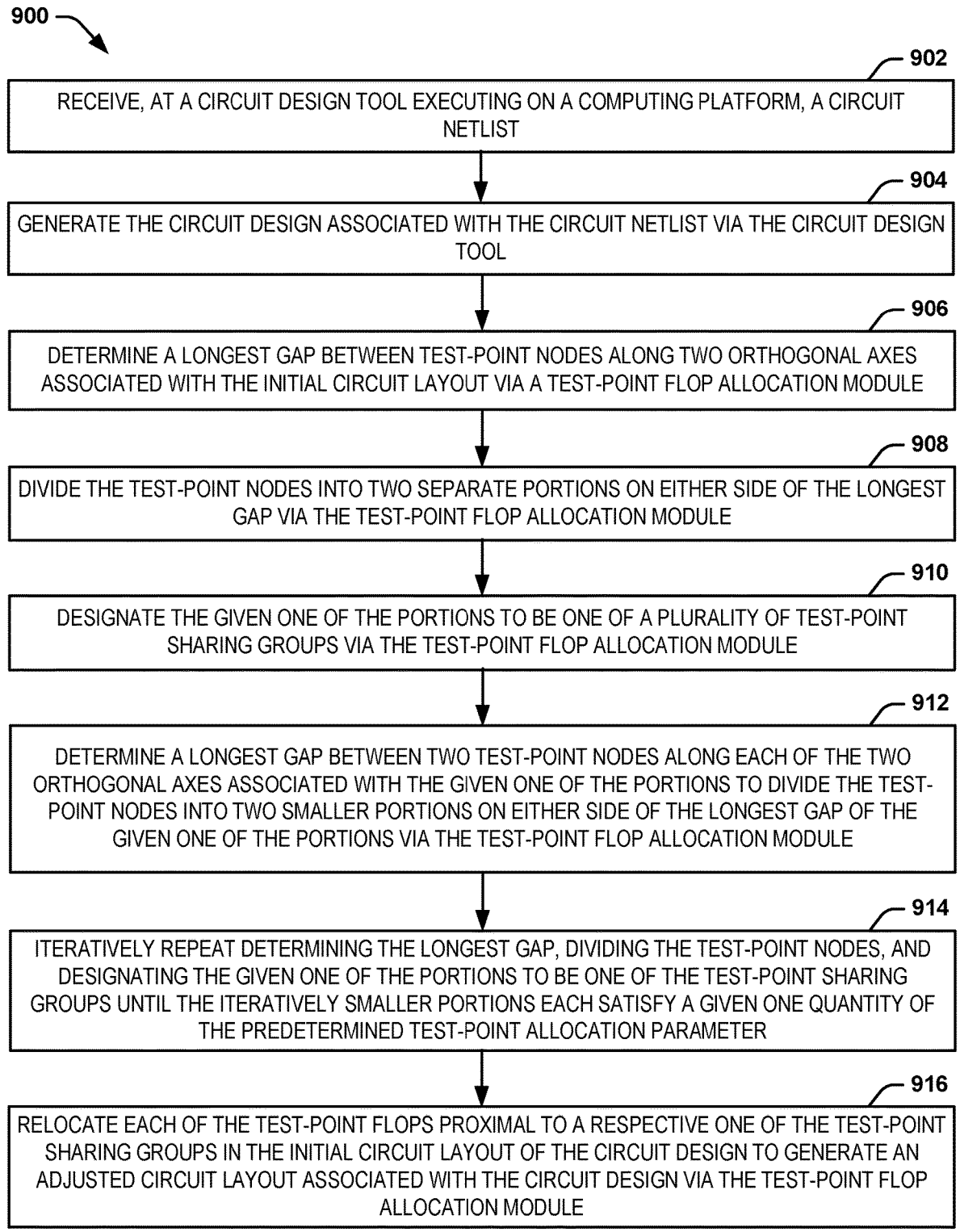
FIG. 9 illustrates an example of a method for allocating test-point flops of scan-chains in a circuit design

In view of the foregoing structural and functional features described above, an example method will be better appreciated with reference to FIG. 9. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an integrated circuit, processor, or a controller, for example.

FIG. 9 illustrates an example of a method for allocating test-point flops (e.g., the test-point flops 306) in scan-chains (e.g., the scan-chain 212) of a circuit design. At 902, at a circuit design tool (e.g., the circuit design tool 106) executing on a computing platform, a circuit netlist (e.g., the circuit netlist NL) is received. The circuit netlist includes functional logic (e.g., the functional logic 202), the test-point nodes interconnecting portions of the functional logic, and the test-point flops. At 904, the circuit design associated with the circuit netlist is generated via the circuit design tool. The circuit design includes an initial circuit layout (e.g., the initial circuit layout 300) comprising a physical layout of the circuit design. At 906, a longest gap between test-point nodes along two orthogonal axes associated with the initial circuit layout is determined via a test-point flop allocation module (e.g., the test-point flop allocation module 110). At 908, the test-point nodes are divided into two separate portions (e.g., the portions 502 and 504) on either side of the longest gap via the test-point flop allocation module. Each of the two portions includes a quantity of the test-point nodes that satisfies the predetermined test-point allocation parameter. At 910, for a given one of the portions having a quantity of the test-point nodes that satisfies a given one quantity of the predetermined test-point allocation parameter, the given one of the portions is designated to be one of a plurality of test-point sharing groups (e.g., the test-point sharing groups 802, 804, 806, and 808) via the test-point flop allocation module.

At 912, for a given one of the portions having a quantity of the test-point nodes that satisfies a sum of quantities of the predetermined test-point allocation parameter, a longest gap between two test-point nodes along each of the two orthogonal axes associated with the given one of the portions is determined to divide the test-point nodes into two smaller portions on either side of the longest gap of the given one of the portions via the test-point flop allocation module. At 914, determining the longest gap, dividing the test-point nodes, and designating the given one of the portions to be one of the test-point sharing groups are iteratively repeated via the test-point flop allocation module until the iteratively smaller portions each satisfy a given one quantity of the predetermined test-point allocation parameter. At 916, each of the test-point flops is relocated proximal to a respective one of the test-point sharing groups in the initial circuit layout of the circuit design to generate an adjusted circuit layout (e.g., provided by the diagram 800) associated with the circuit design via the test-point flop allocation module. The adjusted circuit layout is employable to fabricate an integrated circuit (IC) chip.

Figure 10:
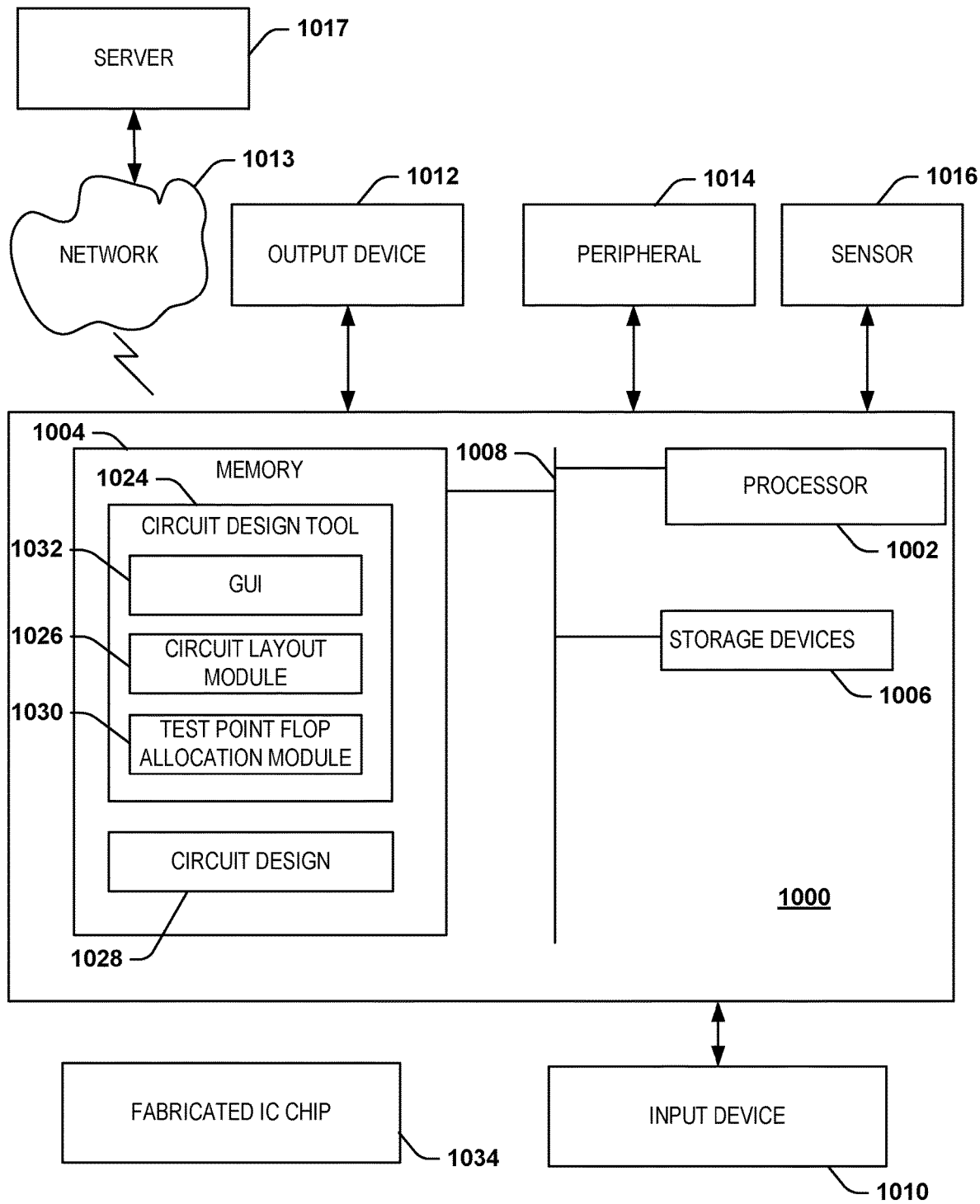
FIG. 10 illustrates an example of a computing system employable to execute a test-point flop allocation module.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory and input and output device(s) to perform one or more embodiments. FIG. 10 illustrates an example of a computing system 1000 employable to execute a test-point flop allocation module.

As shown in FIG. 10, the computing system 1000 can include a computer processor 1002, associated memory 1004 (e.g., RAM), cache memory, flash memory, etc.), one or more storage devices 1006 (e.g., a solid state drive, a hard disk drive, an optical drive such as a compact disk (CD) drive or digital versatile disk (DVD) drive, a flash memory stick, etc.) and numerous other elements and functionalities. The computer processor 1002 may be an IC chip for processing instructions. For example, the computer processor may be one or more cores, or micro-cores of a processor. Components of the computing system 1000 can communicate over a data bus 1008.

The computing system 1000 may also include an input device 1010, such as any combination of one or more of a touchscreen, keyboard, mouse, microphone, touchpad, electronic pen, or any other input device. Further, the computing system 1000 can include an output device 1012, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 1012 can be the same physical device as the input device 1010. In other examples, the output device 1012 and the input device 1010 can be implemented as separate physical devices. The computing system 1000 can be connected to a network 1013 (e.g., LAN, a wide area network (WAN) such as the Internet, a mobile network, or any other type of network) via a network interface connection (not shown). The input device 1010 and output device(s) 1012 can be connected locally and/or remotely (e.g., via the network 1013) to the computer processor 1002, the memory 1004 and/or the storage devices 1006. Many different types of computing systems exist, and the aforementioned input device 1010 and the output device 1012 can take other forms. The computing system 1000 can further include a peripheral 1014 and a sensor 1016 for interacting with the environment of the computing system 1000 in a manner described herein.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 1000 can communicate with a server 1017 via the network 1013.

The memory 1004 can include a circuit design tool 1024. The circuit design tool 1024 can include any of a variety of EDA applications. The circuit design tool 1024 includes a circuit layout module 1026 for generating an initial circuit layout of a circuit design 1028 that is likewise saved in the memory 1004, such as described herein. The circuit design tool 1024 can further include a test-point flop allocation module 1030 that is configured to divide test-point nodes provided in the initial circuit layout into test-point sharing groups, such as defined in a test-point allocation parameter, and to relocate test-point flops to more proximal locations to the test-point sharing groups to generate an adjusted circuit layout of the circuit design 1028. Additionally, the circuit design tool 1024 can include a GUI 1032 for facilitating generation of the circuit design 1028, including providing user implementation of the circuit layout module 1026 and the test-point flop allocation module 1030. The circuit design 1028 can thus be fabricated as an IC chip 1034, such that the fabricated IC chip 1034 can correspond directly to the circuit design 1028.

Further, one or more elements of the aforementioned computing system 1000 can be located at a remote location and connected to the other elements over the network 1013. Additionally, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system comprising:
    a non-transitory memory that stores machine-readable instructions; and
    a processing unit that accesses the memory and executes the machine-readable instructions, the machine-readable instructions comprising an electronic design automation (EDA) application, the EDA application comprising:
        a circuit layout module configured to generate an initial circuit layout in response to a circuit netlist, the circuit netlist comprising functional logic, test-point nodes interconnecting portions of the functional logic, and a plurality of test-point flops associated with scan-chains; and
        a test-point flop allocation module configured to divide the test-point nodes into a plurality of test-point sharing groups based on a physical location of the test-point nodes on the initial circuit layout and based on a predetermined test-point allocation parameter, and to relocate each of the test-point flops proximal to a respective one of the test-point sharing groups in the initial circuit layout of the circuit design to generate an adjusted circuit layout associated with the circuit design.

2. The system of claim 1, wherein the test-point flop allocation module is configured to:
    determine a longest gap between test-point nodes along two orthogonal axes associated with the initial circuit layout;
    divide the test-point nodes into two separate portions on either side of the longest gap, wherein each of the two portions comprises a quantity of the test-point nodes that satisfies the predetermined test-point allocation parameter;
    for a given one of the portions having a quantity of the test-point nodes that satisfies a given one quantity of the predetermined test-point allocation parameter, designate the given one of the portions to be one of the test-point sharing groups;
    for a given one of the portions having a quantity of the test-point nodes that satisfies a sum of quantities of the predetermined test-point allocation parameter, determine a longest gap between two test-point nodes along each of the two orthogonal axes associated with the given one of the portions to divide the test-point nodes into two smaller portions on either side of the longest gap of the given one of the portions; and
    iteratively repeating determining the longest gap, dividing the test-point nodes, and designating the given one of the portions to be one of the test-point sharing groups until the iteratively smaller portions each satisfy a given one quantity of the predetermined test-point allocation parameter.

3. The system of claim 1, wherein dividing the test-point nodes comprises:
    generating a one-dimensional location array of locations of the test-point nodes along a single length of the initial circuit layout;
    determining a longest distance between the locations of two of the test-point nodes along the one-dimensional location array;
    dividing the one-dimensional location array at the longest distance to provide a first portion of the one-dimensional location array comprising a first group of the test-point nodes and a second portion of the one-dimensional location array comprising a second group of the test-point nodes, wherein each of the first and second groups of test-point nodes has a quantity of the test-point nodes that satisfies the predetermined test-point allocation parameter; and
    generating at least one of the test-point sharing groups from each of the first and second groups of the test-point nodes.

4. The system of claim 3, wherein generating the one-dimensional array comprises:
    generating a first one-dimensional array of one-dimensional locations of the test-point nodes along a first length of the initial circuit layout; and
    generating a second one-dimensional array of one-dimensional locations of the test-point nodes along a second length of the initial circuit layout that is orthogonal with respect to the first length;
    wherein determining the longest distance between the locations of the test-point nodes comprises determining the longest distance between the locations of two of the test-point nodes along the first and second one-dimensional arrays of the test-point nodes along the first and second one-dimensional arrays; and
    wherein dividing the one-dimensional location array at the longest distance comprises dividing the first one-dimensional location array or the second one-dimensional array at the longest distance to provide the first portion of the first or second one-dimensional location array and the second portion of the first or second one-dimensional location array.

5. The system of claim 3, wherein dividing the test-point nodes further comprises:
    determining the longest distance between the locations of the test-point nodes along the first portion of the one-dimensional array of the test-point nodes in response to the first group having a quantity of test-point nodes that is a sum of quantities of the predetermined test-point allocation parameter;
    dividing the first portion of the one-dimensional location array at the longest distance to provide a third portion of the one-dimensional location array comprising a third group of the test-point nodes and a fourth portion of the one-dimensional location array comprising a fourth group of the test-point nodes;
    generating at least one of the test-point sharing groups from each of the third and fourth groups of the test-point nodes;
    determining the longest distance between the locations of the test-point nodes along the second portion of the one-dimensional array of the test-point nodes in response to the second group having a quantity of test-point nodes that is a sum of quantities of the predetermined test-point allocation parameter;
    dividing the second portion of the one-dimensional location array at the longest distance to provide a fifth portion of the one-dimensional location array comprising a fifth group of the test-point nodes and a sixth portion of the one-dimensional location array comprising a sixth group of the test-point nodes;
    generating at least one of the test-point sharing groups from each of the fifth and sixth groups of the test-point nodes.

6. The system of claim 1, wherein the circuit layout module is configured as a place-and-route tool to generate the initial circuit layout from the circuit netlist, wherein the place-and-route tool is further configured to adjust placement of the test-point flops and surrounding functional logic in the adjusted circuit layout.

7. The system of claim 1, wherein the test-point flop allocation module is further configured to determine an approximate centroid position between the test-point nodes of each of the test-point sharing groups, and to relocate each of the test-point flops to approximately the centroid position of a respective one of the test-point sharing groups.

8. The system of claim 1, wherein the test-point flop allocation module is further configured to relocate at least one XOR gate and to provide associated interconnects between the respective test-point flop and the respective test-point nodes of each of the test-point sharing groups.

9. The system of claim 1, wherein the circuit layout module is further configured to provide interconnects between the relocated test-point flops in the adjusted circuit layout to form the scan-chain.

10. A non-transitory computer readable medium comprising machine-readable instructions, the machine-readable instructions being executed to:
    receive, at a circuit design tool executing on a computing platform, a circuit netlist comprising functional logic, test-point nodes interconnecting portions of the functional logic, and test-point flops associated with scan-chains;
    generate a circuit design associated with the circuit netlist via the circuit design tool, the circuit design comprising an initial circuit layout comprising a physical layout of the circuit design;
    divide the test-point nodes into a plurality of test-point sharing groups based on a physical location of test-point nodes on the initial circuit layout and based on a predetermined test-point allocation parameter via a test-point flop allocation module executing on the computing platform; and
    relocate each of the test-point flops proximal to a respective one of the test-point sharing groups in the initial circuit layout of the circuit design to generate an adjusted circuit layout associated with the circuit design via the test-point flop allocation module, wherein the adjusted circuit layout is employable to fabricate an integrated circuit (IC) chip.

11. The medium of claim 10, wherein the instructions to divide the test point nodes into a plurality of test-point sharing groups further comprises:
    determining a longest gap between test-point nodes along two orthogonal axes associated with the initial circuit layout;
    dividing the test-point nodes into two separate portions on either side of the longest gap, wherein each of the two portions comprises a quantity of the test-point nodes that satisfies the predetermined test-point allocation parameter;
    for a given one of the portions having a quantity of the test-point nodes that satisfies a given one quantity of the predetermined test-point allocation parameter, designating the given one of the portions to be one of the test-point sharing groups;
    for a given one of the portions having a quantity of the test-point nodes that satisfies a sum of quantities of the predetermined test-point allocation parameter, determining a longest gap between two test-point nodes along each of the two orthogonal axes associated with the given one of the portions to divide the test-point nodes into two smaller portions on either side of the longest gap of the given one of the portions; and
    iteratively repeating determining the longest gap, dividing the test-point nodes, and designating the given one of the portions to be one of the test-point sharing groups until the iteratively smaller portions each satisfy a given one quantity of the predetermined test-point allocation parameter.

12. The medium of claim 10, wherein the instructions further comprise configuring a place-and-route tool to generate the initial circuit layout from the circuit netlist, wherein the place-and-route tool is further configured to adjust placement of the test-point flops and surrounding functional logic in the adjusted circuit layout.

13. The medium of claim 10, wherein the instructions further comprise determining an approximate centroid position between the test-point nodes of each of the test-point sharing groups, and to relocate each of the test-point flops to approximately the centroid position of a respective one of the test-point sharing groups.

14. The medium of claim 10, wherein the instructions further comprise relocating at least one XOR gate and to provide associated interconnects between the respective test-point flop and the respective test-point nodes of each of the test-point sharing groups.

15. The medium of claim 10, wherein the instructions further comprise configuring a place and route tool to provide interconnects between the relocated test-point flops in the adjusted circuit layout to form the scan-chain.

16. A method for allocating test-point flops in scan-chains of a circuit design, the method comprising:

receiving, at a circuit design tool executing on a computing platform, a circuit netlist comprising functional logic, test-point nodes interconnecting portions of the functional logic, and the test-point flops;

generating the circuit design associated with the circuit netlist via the circuit design tool, the circuit design comprising an initial circuit layout comprising a physical layout of the circuit design;

determining a longest gap between test-point nodes along two orthogonal axes associated with the initial circuit layout via a test-point flop allocation module;

dividing the test-point nodes into two separate portions on either side of the longest gap via the test-point flop allocation module, wherein each of the two portions comprises a quantity of the test-point nodes that satisfies the predetermined test-point allocation parameter;

for a given one of the portions having a quantity of the test-point nodes that satisfies a given one quantity of the predetermined test-point allocation parameter, designating the given one of the portions to be one of a plurality of test-point sharing groups via the test-point flop allocation module;

for a given one of the portions having a quantity of the test-point nodes that satisfies a sum of quantities of the predetermined test-point allocation parameter, determining a longest gap between two test-point nodes along each of the two orthogonal axes associated with the given one of the portions to divide the test-point nodes into two smaller portions on either side of the longest gap of the given one of the portions via the test-point flop allocation module;

iteratively repeating, via the test-point flop allocation module, determining the longest gap, dividing the test-point nodes, and designating the given one of the portions to be one of the test-point sharing groups until the iteratively smaller portions each satisfy a given one quantity of the predetermined test-point allocation parameter; and relocating each of the test-point flops proximal to a respective one of the test-point sharing groups in the initial circuit layout of the circuit design to generate an adjusted circuit layout associated with the circuit design via the test-point flop allocation module, wherein the adjusted circuit layout is employable to fabricate an integrated circuit (IC) chip.

17. The method of claim 16, wherein generating the circuit design comprises implementing a place-and-route tool to generate the initial circuit layout from the circuit netlist, the method further comprising adjusting placement of the test-point flops and surrounding functional logic in the adjusted circuit layout via the place-and-route tool.

18. The method of claim 16, wherein relocating each of the test-point flops comprises:

determining an approximate centroid position between the test-point nodes of each of the test-point sharing groups; and relocating each of the test-point flops to the centroid position of a respective one of the test-point sharing groups.

19. The method of claim 16, further comprising relocating at least one XOR gate and providing associated interconnects between the respective test-point flop and the respective test-point nodes of each of the test-point sharing groups.

20. The method of claim 16, further comprising providing interconnects between the relocated test-point flops in the adjusted circuit layout to form the scan-chain.

* * * * *